UNITED STATES PATENT OFFICE.

JOHN COLLINS CLANCY, OF NEW YORK, N. Y., ASSIGNOR TO THE NITROGEN CORPORATION, OF PROVIDENCE, RHODE ISLAND, A CORPORATION OF RHODE ISLAND.

PRODUCTION OF AMMONIA.

1,352,174.   Specification of Letters Patent.   Patented Sept. 7, 1920.

No Drawing.   Application filed March 23, 1916.   Serial No. 86,078.

*To all whom it may concern:*

Be it known that I, JOHN COLLINS CLANCY, a subject of the King of Great Britain, and a resident of the borough of Manhattan, city, county, and State of New York, have invented certain new and useful Improvements in the Production of Ammonia, of which the following is a specification.

My invention relates to the process of producing ammonia from its elements through the agency of cyanamids as catalytic agents therefor, which process is particularly described and pointed out in the following specification and claims.

I have discovered that if a gaseous mixture containing nitrogen and hydrogen is passed in contact with a suitable metal cyanamid or mixture of such cyanamids, the nitrogen and hydrogen of the said gaseous mixture may be caused to unite to form ammonia; said cyanamid or cyanamids acting catalytically in the reaction. For example, calcium cyanamid, or potassium cyanamid, or sodium cyanamid answers well the purpose of the process; and when another suitable metal cyanamid, such as one of those hereinafter referred to, is mixed with the first, the production of ammonia may be caused to take place at a lower temperature; while the velocity of ammonia production is accelerated.

The number of said cyanamids in the mixture obviously need not be limited to two. Thus, by way of illustration:

A mixture composed of manganese cyanamid, cobalt cyanamid and sodium cyanamid may constitute the catalytic agent, such agent being prepared by using the following proportions, by weight; sodium cyanamid 100 parts; manganese cyanamid 10 parts; cobalt cyanamid 10 parts. The whole mixture is then intimately mixed with 80 parts of granular charcoal, the charcoal acting as a support for the catalytic agent. With a catalytic agent so prepared, nitrogen and hydrogen may be made to combine with the production of ammonia at a temperature of 500 to 600° C. and at a pressure preferably less than 100 atmospheres.

In carrying my invention into practice for the production of ammonia, about 140 grams of the immediately above mentioned mixture is placed in a catalytic chamber suitable for ammonia synthesis and there is passed in contact with such catalytic mixture, or as I may term it, catalyzer, a gas current preferably containing one volume of nitrogen and three volumes of hydrogen. With a pressure of gas traversing the chamber within the range of 25 to 100 atmospheres and a temperature of treatment approximately 600° C. I have obtained synthetic ammonia to the extent that the ammonia gas leaving the treating chamber constituted up to 10% by volume of the total gas leaving the treating chamber, this percentage varying upon varying the pressure. The ammonia is removed from the gas discharged from the treating chamber in any suitable manner.

I am aware that it has been proposed to use calcium cyanamid in a process for the production of ammonia, as described in the British patent to Ernest Eugene Naef, No. 14,412 of 1912; but herein the object was not to preserve the calcium cyanamid, and use it as a catalyzer, as in the present case; but rather a mass reaction was involved in which said cyanamid directly participated to the end that from it, itself, together with the gaseous mixture supplied, not only ammonia but also hydrocyanic acid should be produced.

Thus, not alone in such case is the calcium cyanamid destroyed as such; but, further, the resultant products are, as I have found, difficultly separable one from another.

Furthermore, the hydrocyanic acid produced is a deadly poison and one, moreover, exceedingly difficult to handle safely.

In contradistinction to such employment of this particular metal cyanamid, I prefer to use only metal cyanamids exclusively as catalyzers which may be indefinitely preserved if the operation is conducted with the practically self-evident requisite precautions.

As will be noted, in the catalytic mixtures above suggested by way of exemplification, neither the sodium cyanamid, manganese cyanamid, or cobalt cyanamid, are capable, either individually or collectively, in the course of the process, of directly and spontaneously, so to speak, forming cyanids. This feature is of importance if the character of the catalyzer, as such, is to be preserved; or in other words, if a mass reaction directly involving the metal cyanamid or mixture of such cyanamids is to be avoided.

In conclusion, therefore, when the direct product sought is substantially chemically pure ammonia, I wish to emphasize the desirability of using non-cyanid or other cyanogen-compound forming cyanamids, by which, of course, is meant cyanamids which do not form cyanids, hydrocyanic acid, or other cyanogen compounds, at the reaction temperature and under the conditions employed.

Also, while in connection with the catalytic mixture above described with most particularity, I have succeeded in producing a copious yield of ammonia by operating in the range of pressures there referred to; I desire it to be understood that I do not contemplate limiting my invention, in so far as pressures are concerned, to any particular pressure or range of pressures, since this of itself does not wholly intimately concern my process, in which, as a matter of fact, the pressures may be varied widely; although it will be obvious that in accordance with well recognized laws, the intensity of reaction between gaseous elements,—other things being equal,—normally depends largely upon the pressure employed.

What I claim and desire to secure by Letters Patent of the United States is:—

1. The process of producing ammonia which includes passing a gaseous mixture containing nitrogen and hydrogen in contact with a catalytic agent which comprises a mixture of sodium cyanamid, manganese cyanamid, and cobalt cyanamid.

2. The process of producing ammonia which comprises passing a gaseous mixture containing nitrogen and hydrogen under high pressure in contact with a catalytic agent which comprises an alkali metal cyanamid.

3. The process of producing ammonia which comprises passing a gaseous mixture containing nitrogen and hydrogen in contact with a catalytic agent which comprises sodium cyanamid.

4. The process of producing ammonia which comprises effecting a reaction between nitrogen and hydrogen to synthetically yield said ammonia, by passing a gaseous mixture containing said nitrogen and hydrogen under a high pressure in contact with a catalytic composition an active constituent of which is a cyanamid of an alkalinous metal the cyanogen content of which is substantially maintained in said composition during the course of the synthesizing operation.

In testimony whereof I have hereunto signed my name in the presence of two subscribing witnesses.

JOHN COLLINS CLANCY.

Witnesses:
  O. H. RAYMOND,
  HARRY McCORMICK.